March 17, 1959 G. G. LIGHT ET AL 2,878,305

BOOK MESSAGE ADAPTER WITH NUMBER CHECKING

Filed Aug. 23, 1954 4 Sheets-Sheet 1

INVENTORS
G. G. LIGHT
H. A. JANSSON

BY Edward R. Hyde Jr.

ATTORNEY

March 17, 1959 G. G. LIGHT ET AL 2,878,305
BOOK MESSAGE ADAPTER WITH NUMBER CHECKING
Filed Aug. 23, 1954 4 Sheets-Sheet 2

INVENTORS
G. G. LIGHT
H. A. JANSSON
BY Edward R. Hyde Jr.
ATTORNEY

March 17, 1959 G. G. LIGHT ET AL 2,878,305

BOOK MESSAGE ADAPTER WITH NUMBER CHECKING

Filed Aug. 23, 1954 4 Sheets-Sheet 3

INVENTORS
G. G. LIGHT
H. A. JANSSON

BY Edward R. Hyde Jr.

ATTORNEY

BOOK MESSAGE ADAPTER WITH NUMBER CHECKING

Filed Aug. 23, 1954 4 Sheets-Sheet 4

INVENTORS
G. G. LIGHT
H. A. JANSSON
BY Edward R. Hyde Jr.
ATTORNEY

United States Patent Office 2,878,305
Patented Mar. 17, 1959

2,878,305

BOOK MESSAGE ADAPTER WITH NUMBER CHECKING

George G. Light, Scarsdale, and Henry A. Jansson, New York, N. Y., assignors to The Western Union Telegraph Company, New York, N. Y., a corporation of New York Application August 23, 1954, Serial No. 451,488
18 Claims. (Cl. 178—2)

The present invention relates to multiple address telegraph systems and more particularly to a book message adapter of portable construction.

The adapter of the present invention being portable has particular utility in a telegraph switching center of the general type disclosed in the patents to G. G. Light, 2,582,707 and E. J. Agnew, 2,511,832. These switching centers receive messages over a plurality of incoming lines and route the messages across the switching center office to the proper outgoing line in accordance with the address on each message. The switching may be done either manually upon visual inspection of the message or it may be done automatically. In addition to handling single messages, these switching centers also have the problem of receiving and routing book messages. A book message, as is well known, comprises a single text to be delivered to a large number of destinations. Rather than record on tape the copy of the text for each address, much time may be saved by recording the text but once and transmitting it to the various addresses. It is to this function that the present invention is directed.

A primary object of the present invention is to provide a system for interoffice or line transmission of multiple address telegrams wherein the text of a message need be recorded but once on one tape loop and wherein the multiple addresses are recorded on another tape.

A further object of the present invention is to provide a multiple address telegraph system employing a text transmitter and an address transmitter which may be conveniently connected to either a cross-office line in a message center or to an outgoing transmission line.

A further object is to provide a multiple address telegraph system employing two alternately functioning transmitters in which one of said transmitters is controlled by a loop of tape upon which the message text is recorded, and the other transmitter is controlled by a second tape upon which the addresses are recorded and wherein control characters on the tapes effect the switching back and forth of the two transmitters.

A further object of the present invention is to provide a multiple address telegraph system which cooperates with a sequence number indicator adapted to be selectively employed with the multiple address telegraph apparatus.

A still further object is to provide a new and improved system for handling multiple address telegrams that is certain and accurate in operation.

Figure 1:
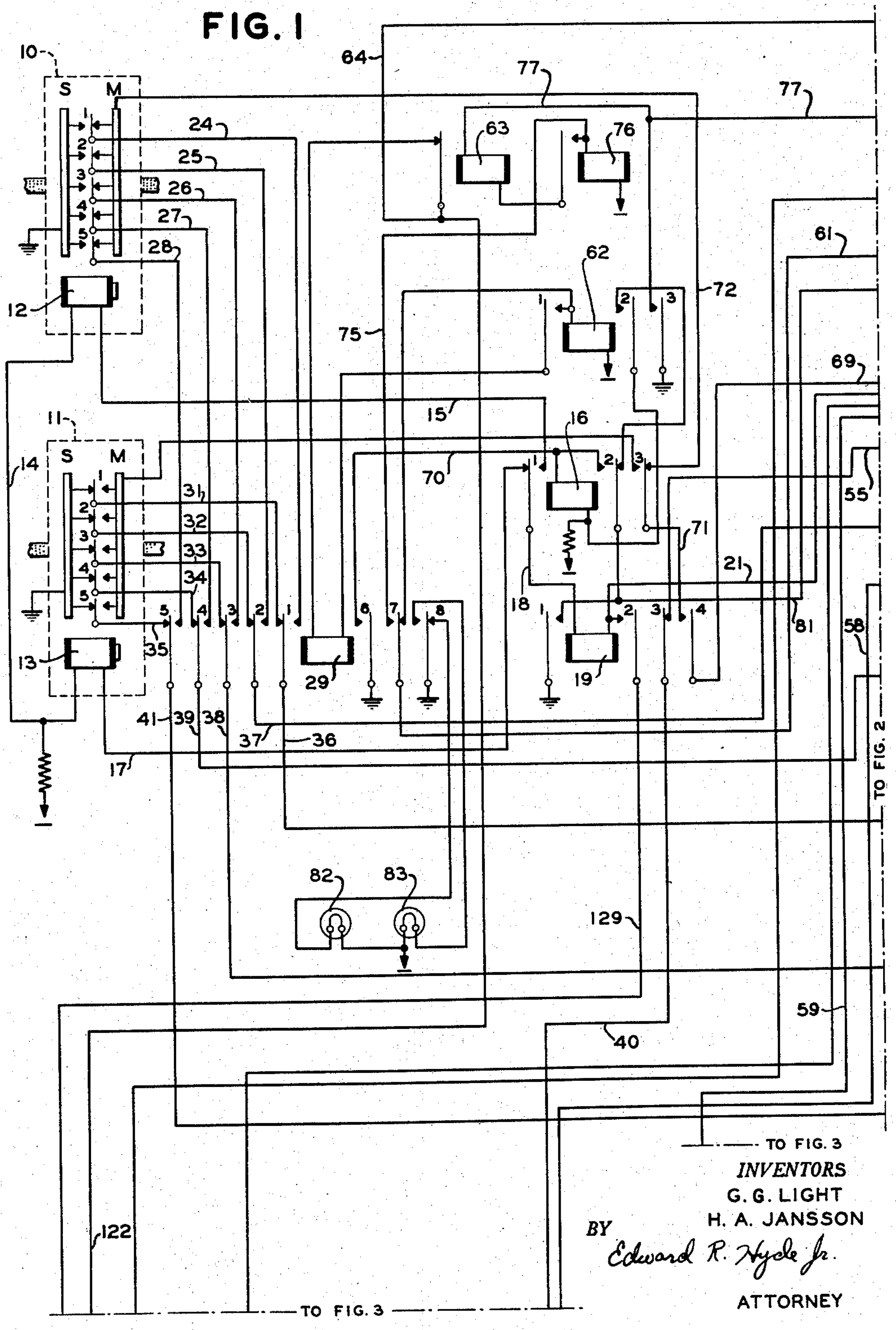
Figure 2:
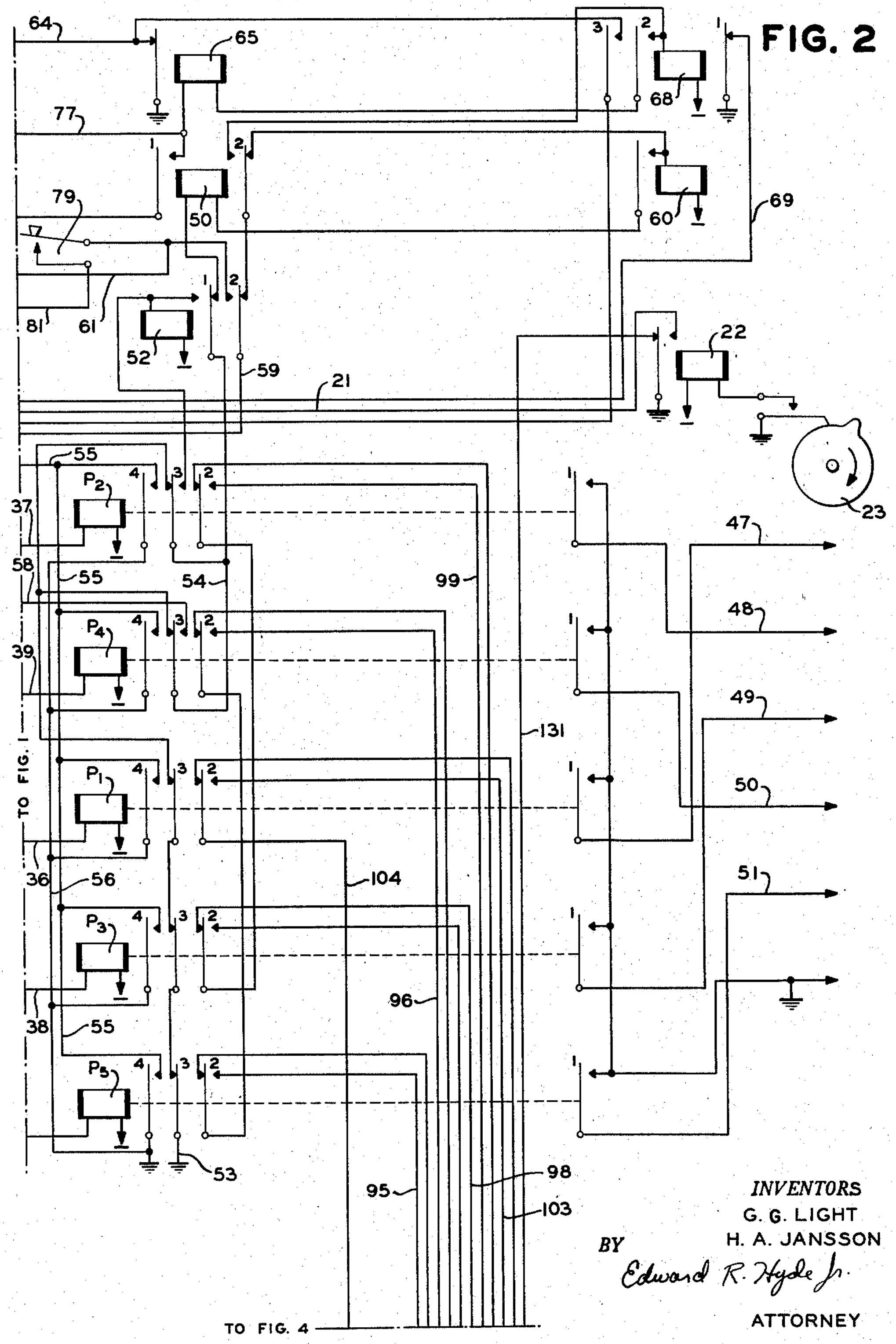
Figure 3:
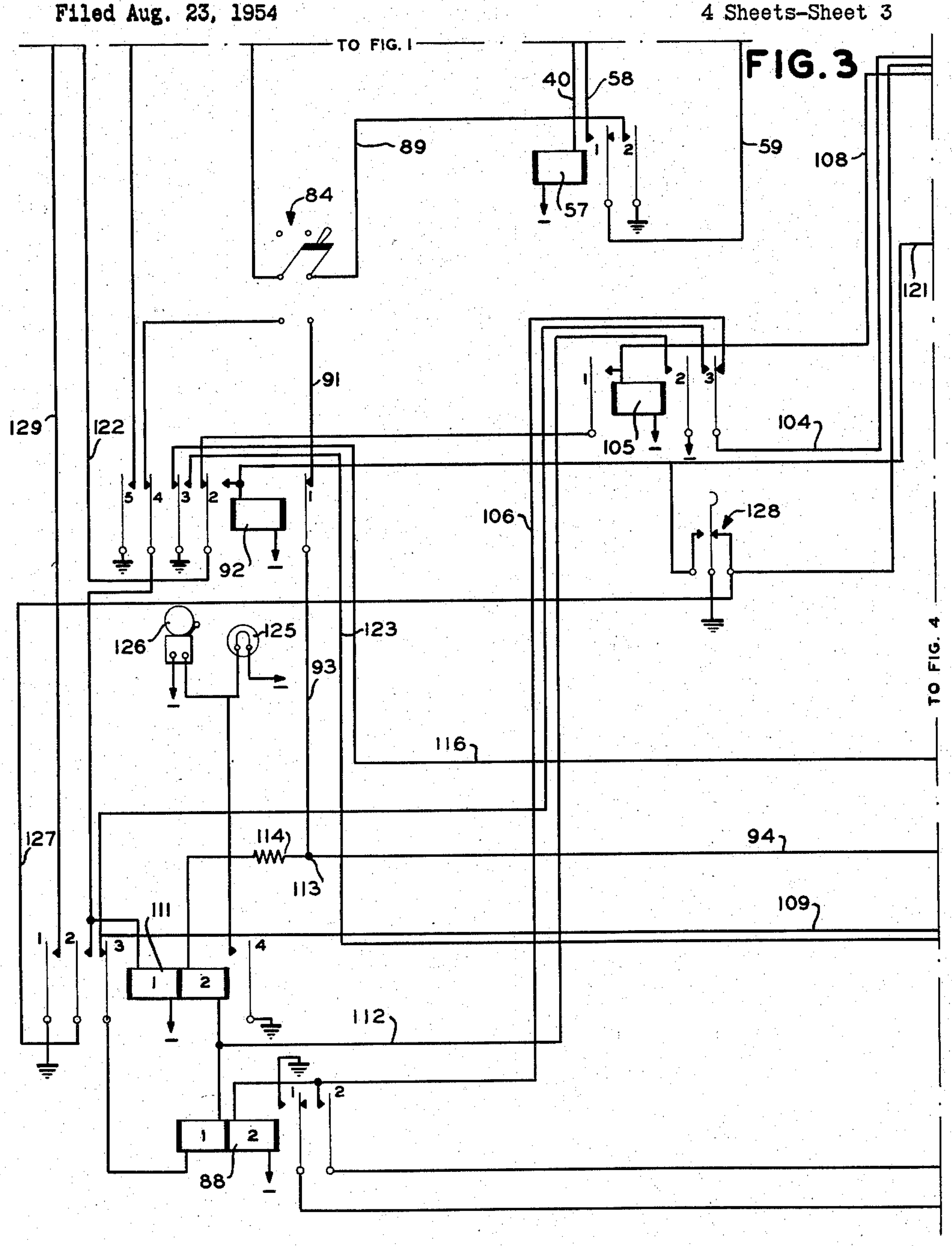
Figure 5:
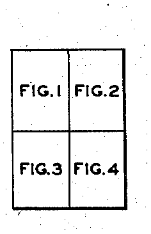
Figure 4:
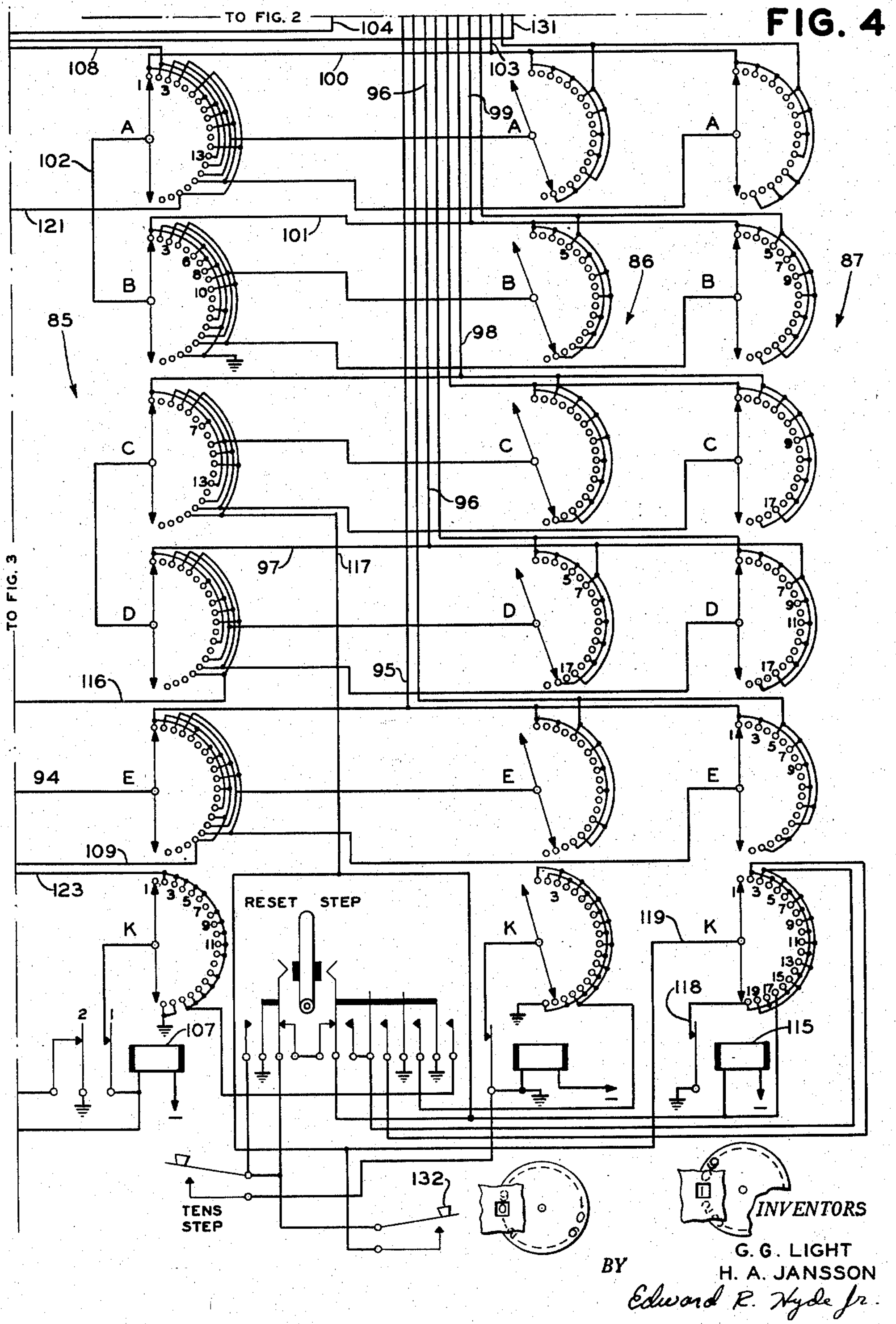

These and other objects will become apparent from the following description taken in view of the drawings, in which:

Figs. 1 to 4 disclose the circuit diagram of the present book message adapter; and Fig. 5 shows the manner in which Figs. 1 to 4 should be arranged.

The book message adapter comprises essentially a text transmitter and an address transmitter which are controlled by relays responsive to special characters on the tape. The message text is recorded on one tape and a loop made thereof. This loop is placed in the text transmitter. Another tape has recorded thereon the various addresses and controls the address transmitter. Control signals on the tape cause first one and then the other of the transmitters to function in the proper sequence. The combination of equals-period has been chosen to effect the switching from one transmitter to the other. Also, a double period, which is utilized as the end-of-message signals, will cause switching from the text transmitter back to the address transmitter. Two signal lamps are provided to indicate which of the transmitters is functioning at a particular time. A sequence number indicator is provided on the adapter and may be manually switched into or out of the circuit with the transmitters. When it is desirable to check the sequence numbers of messages during the functioning of the adapter at a particular point in a message center, the sequence number switch is turned to the On position. When it is unnecessary to use the sequence number indicator on the adapter, this switch is turned to its Off position.

Referring now to the drawings, there is shown a text transmitter 10 and an address transmitter 11 which are of conventional construction. Each transmitter includes a step magnet 12 and 13 respectively, which are connected to battery by wire 14. The other end of step magnet 12 is connected by wire 15 to the make contact 1 of step transfer relay 16. The other side of step magnet 13 is connected by wire 17 to the break contact 1 of relay 16. The tongue of contact 1 is connected to ground through wire 18, relay 19, wire 21, and the make contact of relay 22, to ground. A stepping pulse is produced by relay 22 which is energized once in each cycle by cam 23. Upon energization of relay 22 its make contact closes to complete the circuit for either step magnet 12 or step magnet 13 depending upon the position of armature 1 of relay 16. With armature 1 in the position shown in the drawings, step magnet 13 of the address transmitter 11 is energized. If relay 16 is energized upon the energization of relay 22, the step magnet 12 of the text transmitter 10 will be energized to step the tape. Contacts 1 to 5 of the text transmitter are connected by lines 24, 25, 26, 27 and 28, respectively, to the make contacts 1, 2, 3, 4 and 5, respectively, of relay 29. Similarly, contacts 1 to 5 of the address transmitter are connected to the break contacts 1, 2, 3, 4 and 5 by wires 31, 32, 33, 34 and 35, respectively. The armature of each of these contacts is connected by wires 36, 37, 38, 39 and 41 to pulse relays P1, P2, P3, P4, and P5, respectively, and through these relays to battery, as indicated. Each of these relays controls its respective 1 contact to transmit pulses across office over lines 47, 48, 49, 50 and 51. It is seen from the above that the particular combination of spacing and marking positions of the transmitters will cause a coresponding deenergization of the pulse relays which in turn effect the selective closing of the 1 contacts of the pulsing relays to transmit the particular character across office. It is the relay 29 that determines which transmitter controls the pulse relays P1 to P5. With relay 29 deenergized as shown, the address transmitter 11 is connected to the cross-office line. With relay 29 energized, the text transmitter is connected to the cross-office line.

The operation of the system during normal transmission of a book message is such that the address transmitter is the first to function to send the message sequence number and book identification number. This is followed by an equals-period combination of characters which effects the transfer from the address transmitter to the text transmitter to send the top line of the message. The top line of such message is punctuated with the equals period combination to cause a transfer back to the address transmitter, at which time the address is sent across office. An equals-period combination is again sent to cause a transfer back to the text transmitter to send the body or text of the message. A double period combination punctuates the end of the message to transfer back from the text transmitter to the address transmitter.

With the relays in the position shown in the drawings, the address transmitter will function until an equals period combination is detected and transmitted. The equals character, which is a marking pulse in the No. 2 position, will cause pulse relay P2 to deenergize to cause its break contact 3 to close. Relay 52 is thereby energized over the following circuit: from ground 53 through the make contacts 3 of relays P5, P3, P1, P4 (all energized), wire 54, the break contact 3 of relay P2, through relay 52 to battery. During the next step pulse, which energizes all five of the pulse relays and breaks the circuit just traced, it will be noted that relay 52 remains energized through its make contact 1. Should the next character be anything other than an equals, a period or a blank, the locking circuit is opened and relay 52 releases.

If the next character is a period (fourth pulse marking), pulse relay P4 will deenergize to complete a circuit for relay 57 (Fig. 3) from battery through relay 57, wire 40, closed back contact 3 of relay 19, wire 55, closed back contact 4 of pulse relay P4, and wire 56 to ground. At the same time ground is applied to the make contact 1 of relay 57 as follows: from ground 53, make contact 3 of pulse relays P5, P3, P1, P2, the break contact 3 of relay P4, wire 58 to the make contact 1 of relay 57. Upon energization of this relay, the ground is passed through wire 59, the make contact 2 of relay 52 now energized, wire 61, break contact 7 of relay 29, and relay 62 to battery, thereby energizing relay 62 which prepares its own locking circuit through its contact 1 and relay coil 29. Relay 29 does not energize at this time because it is shorted by the ground applied to contact 1 of relay 62. Upon the next step pulse all of the pulsing relays energize thereby opening the circuit of relay 57 which opens its make contact 1 to break the ground applied to relay 62. Relay 29 is thereby permitted to operate through a circuit which may be traced from battery through relay 62, its closed contact 1, relay 29, the closed contact of relay 63, wire 64, and contact of relay 65 to ground. When relay 29 energizes, it opens the circuit from the address transmitter and connects the pins of the text transmitter 10 to the pulsing relays through the make contacts 1 to 5 of the relay 29. For the duration of the step pulse, a ground is applied from contact 1 of relay 68, wire 69, contact 4 of relay 19, wire 71, break contact 3 of relay 16, and wire 72 to the marking bus bar of the text transmitter. The purpose of this is to maintain all the pulsing relays operated until the end of the step pulse regardless of the character that is resting over the pins of the text transmitter at this time.

The step pulse circuit is prevented from transferring to the text transmitter until the end of the current step pulse thereby insuring that the text transmitter will not be falsely stepped before the first character over its pins has been transmitted. The step pulse transfer circuit may be traced from ground through contact 6 of relay 29 now energized, wire 70, through pulse stepping transfer magnet 16 to battery. However, for the duration of the current step pulse, relay 16 is shunted by a ground from contact 1 of relay 19 through the break contact 2 of relay 16, contact 2 of relay 62 now closed, to relay 16. At the end of the current step pulse relay 19 will deenergize to break this shunting circuit permitting relay 16 to transfer the stepping circuit to the next transmitter.

Transmission will now take place from the text transmitter until another equals-period combination of characters is detected. This combination will appear at the end of the top line of the message in the text transmitter at which time another switching operation will take place in the following manner: upon detection of the equals character, equals relay 52 will energize in the same manner as when switched from the address transmitter to the text transmitter as described above, that is, upon the release of pulse relay P2, its contact 3 will close ground to the equals relay 52 which will thereby energize. Should the next character be anything other than an equals, period or blank, the equals relay will deenergize. However, upon a period (fourth pulse marking) pulse relay P4 will release to energize relay 57. It should be noted in this regard that the release of any of the pulsing relays P1 to P5 will energize relay 57. With relay P4 now deenergized ground is passed to the make contact 1 of relay 57 and over wire 59, make contact 2 of equals relay 52, wire 61, make contact 7 of relay 29, wire 75, relay 76 to battery. When relay 76 operates it closes its contact to complete a circuit through relay 63, wire 77, the make contact 3 of relay 62 now energized to ground. However, relay 63 does not energize at this time because it is shunted by the ground applied to relay 76 contact. When the next step pulse occurs, relay 57 is deenergized to break the ground shunting relay 63 to energize the latter. When the contact of relay 63 opens, the circuit for relays 29 and 62 is opened which transfers the circuit to the pulsing relays back to the address transmitter. For the same reason as described above, when switching to the text transmitter, ground is maintained in this case through the make contact 3 of relay 16 to the marking bus bar of the address transmitter until relay 19 releases at the end of the step pulse. The opening of contact 3 of relay 62 will release relays 63 and 76 whereby all of these relays are in the unoperated state found at the beginning of transmission.

In the event that the transfer characters equals-period have been omitted in the tape, the operator may manually transfer from one transmitter to the other by auto-stopping at the desired point and depressing the transfer button 79. Should the address transmitter be functioning at this time, a ground from contact 1 of relay 19 will operate relay 62 over wire 81, the transfer button 79 and wire 61. Upon release of button 79 transfer relay 29 will operate and transfer the pulsing relays to the text transmitter. The step pulse circuit will also be transferred to the text transmitter when the auto-stop is released.

Transferring manually from the text transmitter to the address transmitter is accomplished in a similar manner. Address lamp 82 is maintained lit through the break contact 8 of transfer relay 29 during the functioning of the address transmitter. Similarly, light 83 is lit to indicate functioning of the text transmitter through the make contact 8 of the transfer relay. In this manner the attendant is continually informed of which transmitter is operating and also of a switching operation.

In normal transmission, a double period only appears in the text tape at the end of the signature to indicate the end of a message. The only other situation calling for a double period is when Bust This is inserted in either transmitter after a wrong comparison has taken place. In either case, the double period reading circuit will function only to transfer back to the address transmitter.

The first period (fourth pulse marking) sends a ground to make contact 1 of relay 57. This may be traced from the ground at contact 3 of relay P5, through the contacts 3 of P3, P1 and P2 all in their make position, the break contact 3 of P4, wire 58 to contact 1 of relay 57. As relay 57 operates by the release of P4, the ground connection is passed by wire 59, break contact 2 of relay 52, break contact 2 of relay 50, relay 60 to battery to operate the latter relay. As the next step pulse causes all the pulsing relays to pull up, the above circuit is broken and a circuit may now be traced from the ground 53, the contacts 3 of relays P5, P3, P1, P4, wire 54, break contact 1 of relay 52, relay 50, relay 60 contact (now closed), relay 60 to battery. Relays 50 and 60 are thereby both energized. Should the next character be anything but an equal or period, the above traced circuit will open and the period storing circuit will be released. Thus it is seen that a single period will have no effect insofar as transferring from one transmitter to another is concerned. However, if the next character is another period thereby indicating an end of message, relays 50 and 60 will remain operated and relay 68 will pull up through a circuit from wire 58 (grounded by release of P4), make contact 1 of relay 57, wire 59, break contact 2 of relay 52, make contact 2 of relay 50, relay 68 and battery. When the next step pulse causes all the pulsing relays to pull up, the operating ground is removed from relay 68 by the release of relay 57. This results in the energization of relay 65 by the circuit from battery at relay 68, coil of relay 68, its closed contact 2, relay 65, contact 3 of relay 62 to ground. When relay 65 thus operates, it opens its contact to break the locking circuit for relays 62 and 29. The release of these relays transfers the operation of the pulse relays back to the address transmitter which is the standby condition of the circuit.

The operation of the circuit so far described will be briefly summarized. Throughout the transmission of a message the transmitters are transferred back and forth by the equals period combination of characters to alternately connect with the pulse relays P1 to P5. Also, at the end of text transmission the pulsing relays are transferred back to the address transmitter by the double period combination of characters. Relay 29 directly controls the transfer operation and with it deenergized the address transmitter is connected to the pulse relays P1 to P5 as shown in the drawings. In transferring to the text transmitter the control relay 29 is governed by the operation of relays 52, 57 and 62. The period following the equals energizes relay 57 to energize relay 62 which pulls up. This would energize the control relay 29 were it not grounded by relay 57. The next step pulse releases relay 57 to remove the ground from one side of control relay 29 to permit it to energize and effect the transfer from the address to the text transmitter. Relay 62 remains energized during transmission from the text transmitter.

The transfer back to the address transmitter is accomplished by deenergizing the control relay 29 which is now governed by relays 52, 57, 63 and 76. As before, the equals character is stored in relay 52 and the following period again energizes relay 57. However, in this case relay 57 causes relay 76 to operate which would deenergize relay 29 were it not for the ground applied to relay 63 by relay 57. The next step pulse removes this ground to energize relay 63 thereby opening the circuit of the control relay 29 to transfer back to the address transmitter.

The function of transferring from text transmitter to address transmitter upon the double period at the end of the message text is somewhat similar. In this case the control relay 29 is primarily governed by relays 50, 60, 65 and 68 in addition to the relay 57. The first period energizes relay 57 which causes relay 60 to pull up. The next step pulse releases relay 57 to permit relay 50 to operate. In this manner a storing condition exists for the first period. The next period will again energize relay 57 to cause relay 68 to pull up. This would result in the energization of relay 65 were it not grounded by relay 57. This ground is removed in the usual way by the next stepping pulse resulting in the operation of relay 65. When this relay operates it opens the locking circuit of relays 62 and 29 to effect the transfer back to the address transmitter.

*Number checking*

As pointed out above, the present book message adapter can be conveniently used at various positions in a telegraph switching center. In many of these positions, the well-known function of sequence number checking is automatically performed. In other positions it is necessary to provide the number checking equipment so as to cooperate with the book message system. A novel sequence number indicator is therefore provided which is mounted on the portable adapter. A manually operable switch 84 selectively controls the operation of the number indicator. The switch is closed when it is desired to connect the number checking unit in the circuit with the book message equipment.

The sequence number indicator has a director switch 85, a tens switch 86 and a units switch 87, each of which is a 20-point, 6-level rotary switch. The director switch functions on a six point cycle. Starting at the first point it will detect the first figure shift character in the address tape, accept the next character, check the tens digit through the tens switch, check the units digit through the units switch, step the indicator to the next digit, operate a check relay and return to the next home position. The cycle is thereupon completed and the director switch 85 is then in position 7. Thus points 1, 7 and 13 are the three home positions of the director switch. The tens and units switches are wired on alternate points as shown to compare for digits one through zero.

In the drawing, the director switch is prepared to read for figure shift at point one and the tens and units switches are prepared to compare for digits zero and one respectively which is the condition for detecting a message numbered 001. The description of the operation of the sequence number indicator will be based on this arrangement shown in the drawing.

When the pins of the address transmitter detect the first figure shift character, represented by 1, 2, 4 and 5 position marking, the pulse relays P1, P2, P4 and P5 will release accordingly and relay 57 will energize as previously described. An energizing circuit for relay 88 may be traced from the ground at contacts 2 of relay 57, wire 89, switch 84, wire 91, contact 1 of relay 92, wire 93, wire 94, wiper and point 1 of level E of director switch 85, wire 95, contacts 2 of P5 and P4, wire 96, wire 97, point 1 of levels D and C, wire 98, contacts 2 of P3 (energized upon sensing of figure shift character), contacts 2 of P2, wire 99, wire 101, point 1 of level B of the director switch, wire 102, point 1 of level A, wire 100, wire 103, contacts 2 of P1, wire 104, break contacts 3 of relay 105, wire 106, winding 2 of relay 88 to battery. The two windings of relay 88 are in additive relation and the tension on the contacts is such that the energization of either winding is sufficient to actuate the contacts.

When relay 88 energizes, its contacts 1 close to complete a circuit for director step magnet 107. Rotary director switch 85 is of the reverse drive type wherein a stepping action is effected upon release of step magnet 107. Hence, when relay 57 releases on the next transmitter step pulse, relay 88 releases to deenergize relay 107 thereby stepping all the levels of the director switch to point 2. It is seen that relay 88 has a locking circuit comprising its contacts 2 and the contacts 2 of relay 107. The purpose of this is to insure a sufficient pulse to energize step magnet 107 in the event that the transmitter step pulse is of such short duration that relay 88 would deenergize before 107 fully energizes. This locking circuit will cause relay 88 to lock up until released by energization of step magnet 107.

With the director switch 85 at point 2 the relay 105 is energized from the ground at point 2 of level B, wire 102, wire 108, relay 105 and battery. The condition for detecting for the presence of the hundreds digit then exists. If a hundreds digit is present, one or more of pulse relays P1 to P5 will release to operate relay 57. A circuit may then be traced from ground at the 2 contact of relay 57, wire 89, switch 84, wires 91, 93 and 94, level E of the director switch (now on point 2), wire 109, closed contact 3 of relay 111, winding 1 of relay 88, wire 112, the 2 contact of relay 105 (now closed) to battery. With the energization of relay 88, the director step magnet 107 is again energized to step the director switch to position 3.

At position 3 the comparison circuit is transferred to the wipers of the tens switch 86 to effect a tens digit check. It is of course realized that the position of the wipers of the tens switch 86 is determined by the number of messages that have been checked through the apparatus. The first nine messages of a sequence, numbered from 001 to 009, will be checked by the tens switch for 0. If there have been no wrong comparison conditions, the tens switch is stepped at this time and the next messages 010 to 019 are checked for 1 in the tens position. It is seen then that the position of switch 86 is representative of a digit that should correspond with the digit sensed by the address transmitter. The digit sensed is transferred to the pulse relays P1 to P5 to control the position of the respective 2 contacts. The combination of positions of these contacts is then compared with the position of the tens switch in a manner now to be described. A so-called probing pulse may be traced from the 2 contact of relay 57 through switch 84 and the 1 contact of relay 92 to point 113. At this point two parallel circuits join. A first parallel circuit goes from point 113, resistor 114, the 2 winding of wrong comparison relay 111, wire 112, 2 contacts of relay 105 (now energized) to battery. This circuit therefore energizes the wrong comparison relay 111, with results which will be hereinafter described, unless the said circuit is shorted. The second parallel circuit goes from point 113 through the series combination of tens switch 86 and the 2 contacts of pulse relays P1 to P5, through the 1 winding of relay 88 to wire 112. If a correct comparison exists, the series circuit comprising the tens switch 86 and the 2 contacts of P1 to P5 form a closed circuit thereby shorting the wrong comparison relay to prevent its operation. Also, relay 88 is energized to step the director switch to point 4.

At point 4, the director switch transfers the comparison circuit to the wipers of the units switch 87. A units comparison is thereupon made similar to the tens comparison described above. Levels A to E of the units switch form a series circuit which upon a correct comparison shorts the wrong comparison relay 111 and also completes a circuit to operate relay 88 resulting in a stepping action of director magnet 107.

At point 5 the units step magnet 115 is energized from the ground at the 3 contact of relay 92, wire 116, wipers D and C of director switch 85, wire 117, unit step magnet 115 to battery. When the units switch is stepped from 9 to 0, the ground at the 3 contact of relay 92 is also passed to the step magnet of the tens switch to advance it one position. When the character following the units digit is set up on the transmitter pins, relay 57 will operate in the usual manner. The ground at contact 2 will be passed by wires 89, 91, 93 and 94 to wiper E and then by wire 109 to relay 88 which is again operated to energize the director switch step magnet which upon release advances the director switch to point 6. As the director switch is stepped the circuit to the units step magnet is opened. This permits the units switch to step to point 2. At this point a circuit can be traced from the ground at the unit step magnet 115 contact, wire 118, the even numbered contacts of level K of the unit switch 87, the K wiper (now on point 2), wire 119 to the units step magnet 115 and battery. The magnet thereupon energizes, opens its contact and deenergizes to step switch 87 to point 3 and step the unit indicator so that the digit 2 appears in the window. It should be noted that the indicator numbers are so spaced that two steps of the units switch causes a number advance of one unit. Thus with the units switch on point 3, the digit 2 is set up in readiness to compare with the units digit of the following message.

At position 6 on the director switch 85, a circuit is completed from ground at point 6 of level B, wiper B (now on point 6), wire 102, wiper A, point 6 of level A, wire 121, correct comparison relay 92, to battery. Upon the operation of the correct comparison relay, the locking circuit for the relay 105 is opened (at break contact 2 of relay 92) and the correct comparison relay 92 locks up through its 2 make contact, wire 122 and the contact of relay 65. The operation of the correct comparison relay 92 indicates that a correct comparison has taken place and the correct comparison circuit is disabled for the remainder of the message by opening the probing circuit at contact 1 of the relay 92. As the 3 make contact of relay 92 is closed, a circuit is completed from ground, wire 123, point 6 of level K of the director switch 85, wiper K, step magnet 107 to battery. The director switch 85 is thereby stepped to position 7 which is the next home position corresponding to position 1. Except for energized relay 92, the sequence number circuit is in the standby condition and ready for the next message. Relay 92 is deenergized when the second period indicating the end of a message is detected. As hereinabove described, the second period causes relay 65 to energize to open its contacts. This breaks the locking circuit for relay 92 which thereupon releases.

*Wrong comparison*

A wrong comparison condition will occur if the tens digit fails to compare, the units digit fails to compare, or if the number checking equipment fails to detect a figures shift character thus failing to initiate the number comparison cycle by the time the double period at the end of a message has been read. The latter failure may result from either equipment failure or the absence of a figures shift character in the tape.

Upon failure of the tens or units digit to compare the series circuit of the tens or units switch and the 2 contacts of the pulse relays is open when the probing pulse is applied. This circuit as previously described is in parallel with the wrong comparison relay 111. With the circuit open and thereby failing to short relay 111, the latter will energize. As the contacts 4 of relay 111 close, the energizing circuit for light 125 and alarm 126 is completed to call attention to the wrong comparison condition. Relay 111 locks up through its contacts 2, wire 127 and the release switch 128. The following step pulse will operate relay 19 in the usual way. However, with a wrong comparison condition existing relay 19 will lock up through its contacts 2, wire 129, contacts 1 of relay 111 (now closed), to ground thereby auto-stopping the adapter. The wrong comparison is then analyzed by the operator who will take the necessary action to remedy the fault. Transmission is restarted by manually pressing the release switch 128 to remove the ground by which relay 111 is locked. However, another holding ground is applied to relay 111 from the break contact of the signal relay 22, wire 131, and the 2 contact of the relay 111. As relay 22 operates on the next step pulse, this ground is opened to deenergize relay 111 which in turn opens the locking circuit for relay 19 thereby releasing the adapter in synchronization with the step pulse. Depressing the release button 128 also operates the correct comparison relay 92 which locks up through wire 122 and the contacts of relay 65. As the contacts 1 of relay 92 open, the comparison circuit is disabled for the remainder of the message. However, in this case the sequence number indicator is not advanced to the next number. It may be stepped manually by positioning the reset-step switch to step and depressing the units step push button 132 if the action taken as a result of the wrong comparison dictates that the indicator should be advanced to the next number.

In the event the number checking equipment has not functioned during transmission of a message to cause the correct comparison relay to energize, the wrong comparison relay 111 will be operated as the double period termination of the message is read. As relay 68 (which operates on the second period) is energized, a ground from the contacts of relay 65 is applied through contacts 3 of relay 68, sequence number switch 84, contacts 4 of relay 92 to the coil of relay 111. Relay 111 will lock up, light the wrong comparison light and auto-stop the adapter in the same manner as previously described. In this case, however, since the entire message has been transmitted, the auto-stopping function serves to prevent the succeeding message from being switched. This feature is relied upon to indicate to the operator that the wrong comparison in this case may be due to equipment failure. After the necessary corrective action has been taken, the adapter is restarted by depressing the release push button 128.

While the present invention has been herein disclosed with reference to a specific embodiment thereof, it is understood that this is not to be considered as limiting the scope of the invention as set forth in the following claims.

What is claimed is:

1. A book message unit for a telegraph system comprising a first transmitter and a second transmitter, output means, means normally coupling said first transmitter to said output means, control means responsive to special characters sensed by said first transmitter to transfer the second transmitter to the output means, said control means including circuit means, means responsive to a first special character to condition said circuit means and means responsive to a second special character to complete said circuit means to decouple the first transmitter from the output means and couple the second transmitter to the output means.

2. A book message unit for a telegraph system comprising a first transmitter adapted to receive an address tape, a second transmitter adapted to receive a tape having a message text thereon, output means, relay means for relaying characters detected by the first and second transmitters to said output means, means to alternately couple the first and second transmitters to said relay means, control means for said means to alternately couple, said control means comprising circuit means, means responsive to a first special character on a respective one of said tapes detected by a coupled transmitter to condition said circuit means and means responsive to a second special character on said respective tape to complete said circuit means whereby a transfer of transmitter coupling to the said relay means is effected.

3. A book message unit for a telegraph system comprising a first transmitter and a second transmitter, each of said transmitters being adapted to be controlled by a respective telegraph tape having control characters, output means, first relay means for relaying characters detected by said transmitters to the output means, second relay means to alternately couple the first and second transmitters to said first relay means, control means for said second relay means, said control means including circuit means, means responsive to a first control character detected by one of said transmitters coupled to said first relay means to store said character and condition said circuit means, and means responsive to a second control character to complete said circuit means whereby a transfer of transmitter coupling to said first relay means is effected.

4. A book message unit for a telegraph system comprising a first transmitter and a second transmitter, each of said transmitters being controlled by a respective telegraph tape having combinations of special characters, each of said combinations of characters comprising a first and second special character, output means, first relay means for relaying characters detected by said transmitters to said output means, second relay means to alternately couple the first and second transmitters to said first relay means, control means for said second relay means, said control means including circuit means, means to store the first special character detected by one of said transmitters and condition said circuit means, means to release said stored character upon detection of a character other than said first or second special characters, and means responsive to said second special character to complete said circuit means.

5. A book message unit for a telegraph system comprising a first transmitter and a second transmitter, each of said transmitters being adapted to receive one of two telegraph tapes having intelligence characters and control characters, stepping means to periodically step the tape through said transmitters, output means, first relay means for relaying characters detected by said transmitters to said output means, second relay means to alternately couple the first and second transmitters to said first relay means, control means for said second relay means, said control means including circuit means, means to store a first control character and condition said circuit means, means to complete said circuit means upon detection of a second control character and means to permit operation of said control means upon actuation of said stepping means to effect a transfer of transmitter coupling of said first and second transmitters to said first relay means.

6. A book message unit for a telegraph system comprising a first transmitter and a second transmitter, each of said transmitters being adapted to receive an individual telegraph tape having intelligence characters and control characters, stepping means to periodically step the tape through said transmitters, output means, first relay means for relaying characters detected by said transmitters to said output means, second relay means to alternately couple the first and second transmitters to said first relay means, control means for said second relay means, said control means including circuit means, means to store a first control character and condition said circuit means, means to complete said circuit means upon detection of a second control character and means whereby said stepping means operates said first relay means to permit operation of said control means to effect a transfer of the transmitter coupling.

7. A book message unit for a telegraph system comprising a first transmitter and a second transmitter, each of said transmitters being adapted to receive an individual telegraph tape having intelligence characters and control characters, a stepping magnet associated with each of said transmitters to step telegraph tape therethrough, stepping means adapted to be selectively coupled to each of said stepping magnets, output means, first relay means for relaying characters detected by said transmitters to said output means, second relay means to alternately couple the first and second transmitters to said first relay means, control means for said second relay means, said control including circuit means, means to store a first control character and condition said circuit means, means to complete said circuit means upon detection of a second control character, means to permit operation of said control means upon actuation of said stepping means and means to transfer the coupling of said stepping magnets and stepping means.

8. A device of the character described comprising a first tape controlled transmitter, a second tape controlled transmitter, a stepping magnet associated with each of said transmitters to step tape therethrough, a source of periodic stepping pulses, output means, means to selectively couple said first and second transmitters to said output relay means, means to selectively couple said source of stepping pulses to the stepping magnets, means to operate said transmitter coupling means upon detection of a combination of control characters in said telegraph tape to effect a transfer of transmitter coupling and means controlling said relay means to prevent transfer of the source of periodic stepping pulses from one stepping magnet to the other stepping magnet during a stepping pulse.

9. A book message unit for a telegraph system comprising a first transmitter and a second transmitter, said first transmitter being controlled by telegraph tape having a first combination of special characters, said second transmitter being controlled by telegraph tape having said first combination of special characters and a second combination of special characters, output means, means to selectively couple the first and second transmitters to said output means, control means responsive to said first combination of special characters detected by said first and second transmitters to control said second named means whereby a transfer of transmitter coupling to the output means is effected, said control means being further responsive to said second combination of special characters detected by said second transmitter to control the second named means whereby the second transmitter is decoupled from said output means and the first transmitter is coupled thereto.

10. The combination as defined in claim 9 wherein said control means includes electrical circuit means and each of said first and second combinations of special characters comprises two control characters, means responsive to the first control character in each of the combinations of special characters to condition said electrical circuit means and means responsive to the second control character to complete said electrical circuit means to effect a transfer of transmitter coupling.

11. In a system for transmitting coded messages from telegraph tape wherein each message is terminated by a special character and successive messages are consecutively numbered, a sequence number unit comprising indicating means for automatically setting up consecutive message numbers, means to store message numbers as read from the telegraph tape, means to compare said stored message numbers with the numbers set up by said indicating means, said means to compare comprising a parallel circuit having two branches, one of said branches including a first relay adapted to be energized during each number comparison cycle, the other of said branches comprising a circuit including said storage means and said indicating means whereby said first relay is prevented from operating upon correspondence of the numbers represented by said storage means and said indicating means and means whereby failure of said sequence number unit to operate results in energization of said first relay upon termination of a message.

12. A device of the character described comprising a first transmitter and a second transmitter, each of said transmitters being adapted to receive telegraph tape having intelligence characters and control characters and wherein the messages are consecutively numbered, a stepping magnet associated with each of said transmitters to step telegraph tape therethrough, stepping means adapted to be selectively coupled to each of said stepping magnets, output means, first relay means for relaying characters detected by said transmitters to said output means, second relay means to alternately couple the first and second transmitters to said first relay means, control means for said second relay means, said control means including electrical circuit means, means to store a first control character and condition said electrical circuit means, means to complete said electrical circuit means upon detection of a second control character, means to permit operation of said control means upon actuation of said stepping means, means to transfer the coupling of said stepping magnets and stepping means, a sequence number unit, means responsive to a special character to condition said unit for number checking, means to check for the presence of the first digit of each message number, switch means for automatically setting up consecutive message numbers, means to compare message numbers represented by said first relay means with message numbers set up by said switch means, said means to compare comprising a parallel circuit having two branches, one of said branches including electrical responsive means adapted to be energized during each number comparison, the other of said branches comprising a circuit including said first relay means and said switch means whereby the electrical responsive means is prevented from operating when the number represented by the relay means corresponds to the number set up by said switch means, and means to operate said electrical responsive means at the termination of a message upon failure of said sequence number unit to effect a number comparison.

13. In a system of the character described, a pair of telegraph transmitters, relay means, means to alternately couple said transmitters to the relay means, said relay means being adapted to store message sequence numbers received from said transmitters, means to automatically set up consecutive message numbers, means to compare message numbers stored by said relay means with the message numbers automatically set up, said means to compare comprising a parallel circuit having two branches, one of said branches having electrical responsive means, the other of said branches including the relay means and the said means to automatically set up consecutive message numbers whereby the electrical responsive means is prevented from energizing when the stored message number and the set up number correspond.

14. In a system of the character described, a pair of transmitters adapted to receive telegraph tape having message characters and control characters and wherein successive messages are consecutively numbered, output means, means to selectively couple the transmitters to said output means in response to the control characters on said tape, means including a plurality of relay means to control said means to selectively couple, said plurality of relay means being adapted to store message sequence numbers received from the transmitters, means to automatically set up consecutive message numbers, means to compare message numbers stored by said plurality of relay means with the message numbers automatically set up, said means to compare comprising a parallel circuit having two branches, one of said branches including electrical responsive means, the other of said branches including the plurality of relay means and the said means to automatically set up consecutive message numbers whereby the electrical responsive means is prevented from energizing when the stored message number and the set up number correspond.

15. In a system of the character described a first transmitter and a second transmitter, each of said transmitters being adapted to receive telegraph tape having message characters and control characters and wherein successive messages are consecutively numbered, output means, means normally coupling said first transmitter to said output means, control means responsive to said control characters sensed by said first transmitter to transfer the second transmitter to the output means, said control means including electrical circuit means, means responsive to a first control character to condition said electrical circuit means, means responsive to a second control character to complete said electrical circuit means to effect a transfer of transmitter coupling to the output means, said control means further including relay means adapted to store message sequence numbers received from said tape transmitters, means to automatically set up consecutive message numbers, means to compare message numbers stored by said relay means with the message numbers automatically set up, said means to compare comprising a parallel circuit having two branches, one of said branches having electrical responsive means, the other of said branches including the relay means and the said means to automatically set up consecutive message numbers whereby the electrical responsive means is prevented from energizing when the stored message number and the set up number correspond.

16. A device of the character described comprising a first transmitter and a second transmitter, each of said transmitters being adapted to receive telegraph tape having intelligence characters and control characters and wherein the messages are consecutively numbered, a stepping magnet associated with each of said transmitters to step telegraph tape therethrough, stepping means adapted to be selectively coupled to each of said stepping magnets, output means, first relay means for relaying characters detected by said transmitters to said output means, second relay means to alternately couple the first and second transmitters to said first relay means, control means for said second relay means, said control means including electrical circuit means, means to store a first control character and condition said electrical circuit means, means to complete said electrical circuit means upon detection of a second control character, means to permit operation of said control means upon actuation of said stepping means, means to transfer the coupling of said stepping magnets and stepping means, a sequence number unit, means responsive to a special character to condition said unit for number checking, means to check for the presence of the first digit of each message number, said first relay means being responsive to the remaining digits of a message number, switch means for automatically setting up consecutive message numbers, means to compare message numbers represented by said first relay means with message numbers set up by said switch means, said means to compare comprising a parallel circuit having two branches, one of said branches including electrical responsive means adapted to be energized during each number comparison, the other of said branches comprising a circuit including said first relay means, and said switch means whereby the electrical responsive means is prevented from operating when the number represented by the relay means corresponds to the number set up by said switch means.

17. A device of the character described comprising a first transmitter and a second transmitter, each of said transmitters being adapted to receive telegraph tape having message characters and control characters and wherein messages are consecutively numbered, output means, means normally coupling said first transmitter to said output means, control means responsive to said control characters sensed by said first transmitter to transfer the second transmitter to the output means, said control means including electrical circuit means, means responsive to a first control character to condition said electrical circuit means and means responsive to a second control character to complete said electrical circuit means whereby a transfer of transmitter coupling to the output means is effected, and means to check the consecutive numbering of said messages.

18. A device of the character described comprising a first transmitter and a second transmitter, each of said transmitters adapted to be operated by perforated telegraph tape having coded message characters and wherein successive messages are consecutively numbered, a stepping magnet associated with each of said transmitters to step telegraph tape therethrough, stepping means adapted to be selectively coupled to each of said stepping magnets, output means, first relay means for relaying characters detected by said transmitters to said output means, second relay means to alternately couple the first and second transmitters to said first relay means, control means for said second relay means, said control means including electrical circuit means, means to store a first control character and condition said electrical circuit means, means to complete said electrical circuit means upon detection of a second control character, means to permit operation of said control means upon actuation of said stepping means, means to transfer the coupling of said stepping magnets and stepping means, and means including said first relay means for checking the sequence of said numbered messages.

References Cited in the file of this patent

UNITED STATES PATENTS

| | | |
|---|---|---|
| 2,116,506 | Car et al. | May 10, 1938 |
| 2,487,186 | Schuler | Nov. 8, 1949 |
| 2,570,505 | Watson | Oct. 9, 1951 |
| 2,582,707 | Light et al. | Jan. 15, 1952 |
| 2,587,253 | Vernam | Feb. 26, 1952 |
| 2,608,615 | Oberman | Aug. 26, 1952 |
| 2,641,641 | Edgar | June 9, 1953 |
| 2,714,626 | Locke | Aug. 2, 1955 |